Antony Wallach
Impt. in Hooks for Watch Chains.

PATENTED DEC. 3 1867

71824

Witnesses
Chas. H. Smith
Geo. D. Walker

Antony Wallach

United States Patent Office.

ANTONY WALLACH, OF NEW YORK, N. Y., ASSIGNOR TO HIMSELF AND ADOLPH WALLACH, OF SAME PLACE.

Letters Patent No. 71,824, dated December 3, 1867.

SAFETY-HOOK FOR WATCH-CHAINS.

The Schedule referred to in these Letters Patent and making part of the same.

TO ALL WHOM IT MAY CONCERN:

Be it known that I, ANTONY WALLACH, of the city and State of New York, have invented, made, and applied to use, a certain new and useful Improvement in Hooks for Watch-Chains; and I do hereby declare the following to be a full, clear, and exact description of the said invention, reference being had to the annexed drawing, making part of this specification, wherein—

Figure 1:
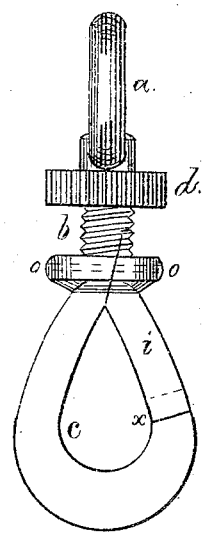
Figure 2:
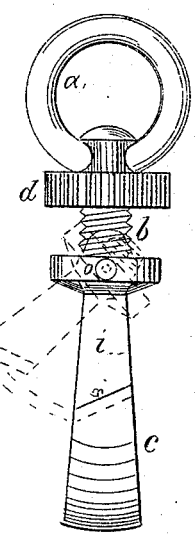

Figure 1 is an elevation of said hook, with the nut raised ready to be opened, and Figure 2 is a similar view at right angles to fig. 1, the tongue of the hook being shown in red lines as turned aside to open said hook.

Similar marks of reference denote the same parts.

The object of my invention is to furnish a means for reliably closing the hook after the ring of the watch has been entered therein. Heretofore this has been effected by half of the hook being hinged to the standing part, and when closed retained by a nut run over the end of the moving section. In this construction the joint generally comes at the part of the hook where the watch-shank ring is in contact with the hook; hence both ring and hook are apt to be worn by the constant motion and roughnesses or openings of said joints.

The nature of my said invention consists in a tongue attached by a pin at the upper end of the hook, one end of the tongue extending, so as to come into contact with the end of the hook, and the other end of said tongue forming part of the screw-shank of the hook, over which a nut is screwed, when the tongue is in contact with the end of the hook, preventing the same being opened until the nut is screwed along the shank out of contact with the end of the tongue.

In the drawing, $a$ is the swivel-ring, to which the watch-chain or guard is to be attached as usual. $b$ is the screw-shank of the hook $c$, and $d$ is a nut or burr on the shank $b$. The hook $c$ extends to the point $x$, and between this and the shank $b$ the swinging tongue $i$ is introduced. This is attached by a rivet or screw at $o$, and the shorter end forms a portion of the screw of the shank $b$, said shank being removed on one side for the reception of this tongue. It will now be understood that the tongue is held in place by screwing the nut $d$ over the end of the tongue, and on the contrary, that the hook can be opened when the nut is in the position shown, by turning the tongue aside on its pin $o$, (see red lines, fig. 2.)

What I claim, and desire to secure by Letters Patent, is—

The tongue $i$, attached to the shank $b$ by the pin $o$, so as to turn aside from the hook $c$, in combination with the nut $d$, as and for the purposes specified.

In witness whereof, I have hereunto set my signature, this 17th day of July, A. D. 1867.

ANTONY WALLACH.

Witnesses:
CHAS. H. SMITH,
GEO. D. WALKER.